(12) United States Patent
Tamaoka et al.

(10) Patent No.: US 9,341,214 B2
(45) Date of Patent: May 17, 2016

(54) SLEEVE, FLUID DYNAMIC PRESSURE BEARING INCLUDING THE SLEEVE, SPINDLE MOTOR INCLUDING THE FLUID DYNAMIC PRESSURE BEARING AND ELECTRONIC EQUIPMENT INCLUDING THE SPINDLE MOTOR

(71) Applicant: NIDEC CORPORATION, Kyoto (JP)

(72) Inventors: Takehito Tamaoka, Kyoto (JP); Kiyoto Ida, Kyoto (JP); Masashi Hirayama, Kyoto (JP); Kazuhiko Fukushima, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 44 days.

(21) Appl. No.: 14/264,675

(22) Filed: Apr. 29, 2014

(65) Prior Publication Data

US 2015/0030268 A1    Jan. 29, 2015

Related U.S. Application Data

(60) Provisional application No. 61/857,862, filed on Jul. 24, 2013.

(51) Int. Cl.
| | |
|---|---|
| *F16C 33/10* | (2006.01) |
| *F16C 32/06* | (2006.01) |
| *F16C 33/74* | (2006.01) |
| *F16C 17/04* | (2006.01) |

(52) U.S. Cl.
CPC ............. *F16C 33/104* (2013.01); *F16C 33/745* (2013.01); *F16C 17/045* (2013.01); *F16C 33/1085* (2013.01); *F16C 2370/12* (2013.01)

(58) Field of Classification Search
CPC .... F16C 33/104; F16C 33/106; F16C 33/107; F16C 33/1023; F16C 32/0696
USPC ................. 384/100, 107, 112, 114, 121, 123; 29/898.02, 898.041
See application file for complete search history.

(56) References Cited

U.S. PATENT DOCUMENTS

| | | | | |
|---|---|---|---|---|
| 5,707,154 | A * | 1/1998 | Ichiyama ...................... | 384/107 |
| 5,791,785 | A * | 8/1998 | Nose et al. ..................... | 384/119 |
| 6,250,807 | B1 * | 6/2001 | Mori et al. ..................... | 384/100 |
| 6,296,391 | B1 * | 10/2001 | Hayakawa et al. ........... | 384/119 |
| 6,860,636 | B2 * | 3/2005 | Takahashi ..................... | 384/119 |
| 6,890,104 | B2 * | 5/2005 | Gomyo et al. ................ | 384/119 |

(Continued)

FOREIGN PATENT DOCUMENTS

| | | |
|---|---|---|
| JP | 61-82020 A | 4/1986 |
| JP | 1-93617 A | 4/1989 |

(Continued)

*Primary Examiner* — Marcus Charles
(74) *Attorney, Agent, or Firm* — Westerman, Hattori, Daniels & Adrian, LLP

(57) ABSTRACT

A porous oil-impregnated sleeve is used for a fluid dynamic pressure bearing. The sleeve includes an inner surface, a first axial end face, a first recessed portion, and a first dynamic pressure generating groove. The first recessed portion is positioned on the other side of a line segment, which connects one-side end portion of the inner surface with an inner end portion of the first axial end face, in a cross-section including the central axis. A bottom portion of the first recessed portion, which has the longest distance between itself and the line segment, is positioned closer to the other side than a bottom portion of the first dynamic pressure generating groove in the axial direction.

16 Claims, 7 Drawing Sheets

(56) References Cited

U.S. PATENT DOCUMENTS

| | | |
|---|---|---|
| 7,005,768 B2 | 2/2006 | Tamaoka et al. |
| 7,201,516 B2 * | 4/2007 | Haga .............................. 384/132 |
| 7,374,341 B2 * | 5/2008 | Schmid ........................ 384/100 |
| 7,625,123 B2 * | 12/2009 | Ishikawa et al. ............... 384/100 |
| 8,499,456 B2 * | 8/2013 | Yamashita et al. ......... 29/898.02 |
| 8,613,553 B2 * | 12/2013 | Komori et al. ................ 384/107 |
| 2005/0100256 A1 * | 5/2005 | Nagarathnam et al. ....... 384/107 |
| 2006/0072242 A1 * | 4/2006 | Tamaoka ................... 360/99.08 |

FOREIGN PATENT DOCUMENTS

| | | |
|---|---|---|
| JP | 3-265440 A | 11/1991 |
| JP | 2004-176816 A | 6/2004 |
| JP | 2010-144778 A | 7/2010 |

* cited by examiner

SLEEVE, FLUID DYNAMIC PRESSURE BEARING INCLUDING THE SLEEVE, SPINDLE MOTOR INCLUDING THE FLUID DYNAMIC PRESSURE BEARING AND ELECTRONIC EQUIPMENT INCLUDING THE SPINDLE MOTOR

BACKGROUND

Electronic equipment such as a hard disk drive is provided with a spindle motor that rotates a disk. The spindle motor includes a stationary section that is fixed to a housing of the electronic equipment and a rotating section that rotates while supporting the disk.

The stationary section and the rotating section of the spindle motor are connected to each other through a dynamic pressure bearing unit. A dynamic pressure bearing unit in the related art includes, for example, a shaft member, a sleeve, and a housing receiving the sleeve. The dynamic pressure bearing unit in the related art and a spindle motor including the dynamic pressure bearing unit are disclosed in, for example, JP-A-2004-176816.

In JP-A-2004-176816, a circumferential groove is formed on an upper end face of a bearing sleeve. When the circumferential groove is to be formed on the upper end face of the bearing sleeve by, for example, press forming, there is a problem in that an inner peripheral surface of the bearing sleeve protrudes inwardly in a radial direction during the press forming. In this case, a gap, which is formed between an outer peripheral surface of the shaft member and the inner peripheral surface of the bearing sleeve, becomes non-uniform. For this reason, the outer peripheral surface of the shaft member and the inner peripheral surface of the bearing sleeve come into contact with each other during the drive of the spindle motor.

SUMMARY

A first exemplary aspect of the invention is to provide a porous oil-impregnated sleeve that is used for a fluid dynamic pressure bearing. A sleeve is filled with a lubricant. The sleeve extends around a central axis.

The sleeve includes an outer surface, an inner surface, a first axial end face that is positioned on one side in an axial direction, a first recessed portion, and a first dynamic pressure generating groove. The first recessed portion is a connecting surface that connects the inner surface with the first axial end face. The first dynamic pressure generating groove is positioned on the first axial end face and is recessed toward the other side.

The first recessed portion is positioned on the other side of a line segment, which connects one-side end portion of the inner surface with an inner end portion of the first axial end face, in a cross-section including the central axis. A bottom portion of the first recessed portion, which has the longest distance between itself and the line segment, is positioned closer to the other side than a bottom portion of the first dynamic pressure generating groove in the axial direction.

According to the first exemplary aspect of the invention, the protruding of the inner surface of the sleeve inwardly in a radial direction is suppressed.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In this specification, the upper side in a central axis direction of a motor is simply referred to as an "upper side" and the lower side is simply referred to as a "lower side". Meanwhile, a vertical direction does not represent a position relationship or a direction when the motor is assembled in an actual device. Further, a direction parallel to a central axis J1 or a direction substantially parallel to the central axis J1 is referred to as an "axial direction", a radial direction having a center on the central axis J1 is simply referred to as a "radial direction", and a circumferential direction having a center on the central axis is simply referred to as a "circumferential direction".

Figure 1:
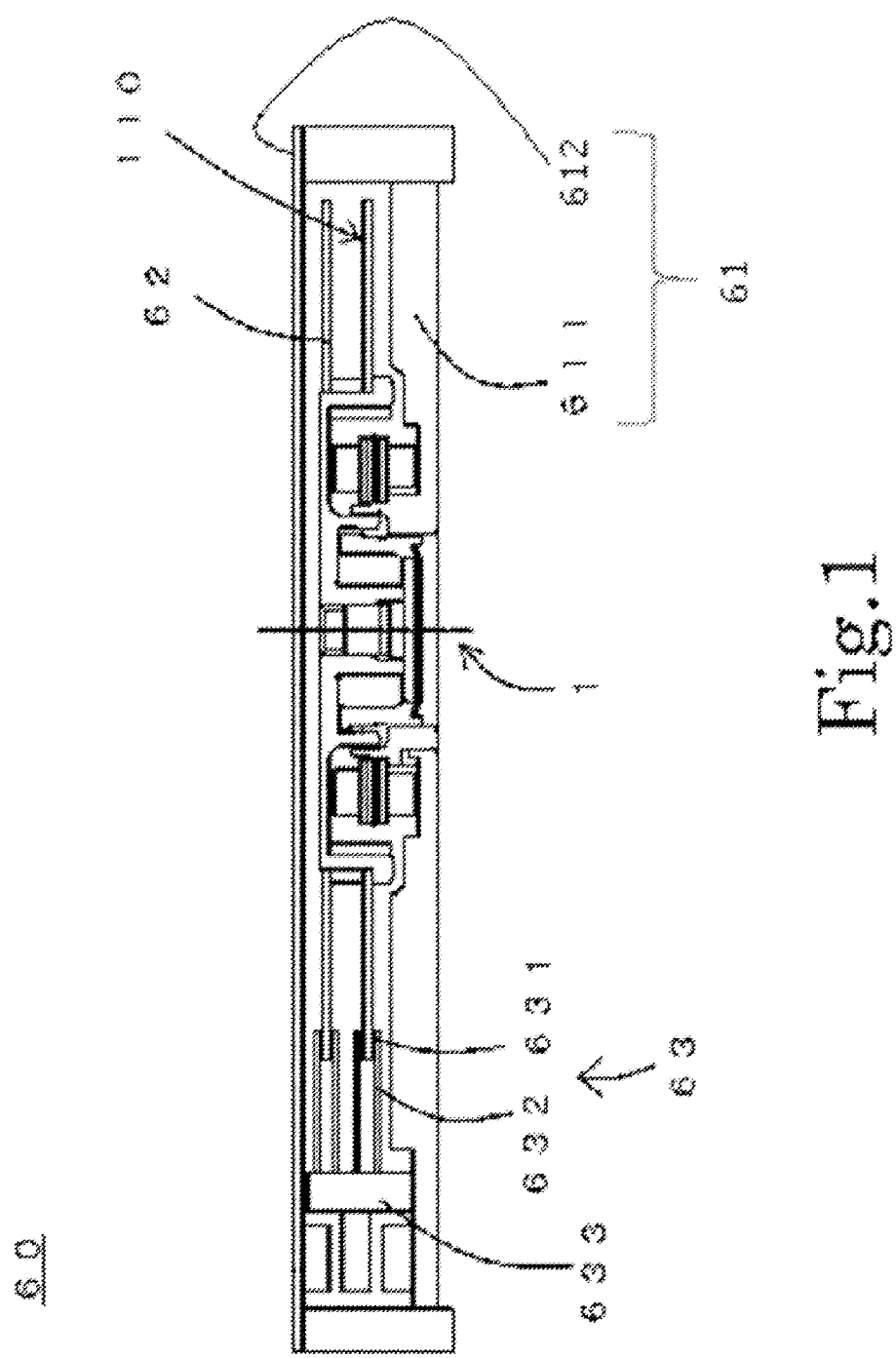
FIG. 1 is a schematic cross-sectional view of a disk drive device.

FIG. 1 is a cross-sectional view showing the internal structure of a disk drive device 60 that includes an electric spindle motor 1 (hereinafter, referred to as a "motor 1".) according to a preferred embodiment of the invention. A disk drive device will be described as an example of electronic equipment. The disk drive device 60 is, for example, a hard disk drive. The disk drive device 60 includes a disc-shaped recording disk 62 that records information, an access unit 63, an electric motor 1, and a housing 61. The access unit 63 reads and(or) writes information from and in the recording disk 62. The motor 1 holds and rotates the recording disk 62. The housing 61 receives the recording disk 62, the access unit 63, and the motor 1 in an inner space 110.

As shown in FIG. 1, the housing 61 includes a first housing member 611 and a second housing member 612. The first housing member 611 includes an opening at the upper portion thereof, and the motor 1 and the access unit 63 are mounted on the bottom of the first housing member 611. The second housing member 612 forms the inner space 110 together with the first housing 611 by covering the opening of the first housing member 611.

The recording disk 62 is mounted on the motor 1. The access unit 63 includes a head 631, an arm 632, and a head moving mechanism 633. The head 631 is close to the recording disk 62, and magnetically writes and reads information. The arm 632 supports the head 631. The head moving mechanism 633 changes the position of the head 631 relative to the recording disk 62 by moving the arm 632. The head 631 has access to a required position on the recording disk 62 by these structures, and writes and reads information. Meanwhile, the head 631 has only to perform at least one of the writing and reading of information in and from the recording disk 62.

Figure 2:
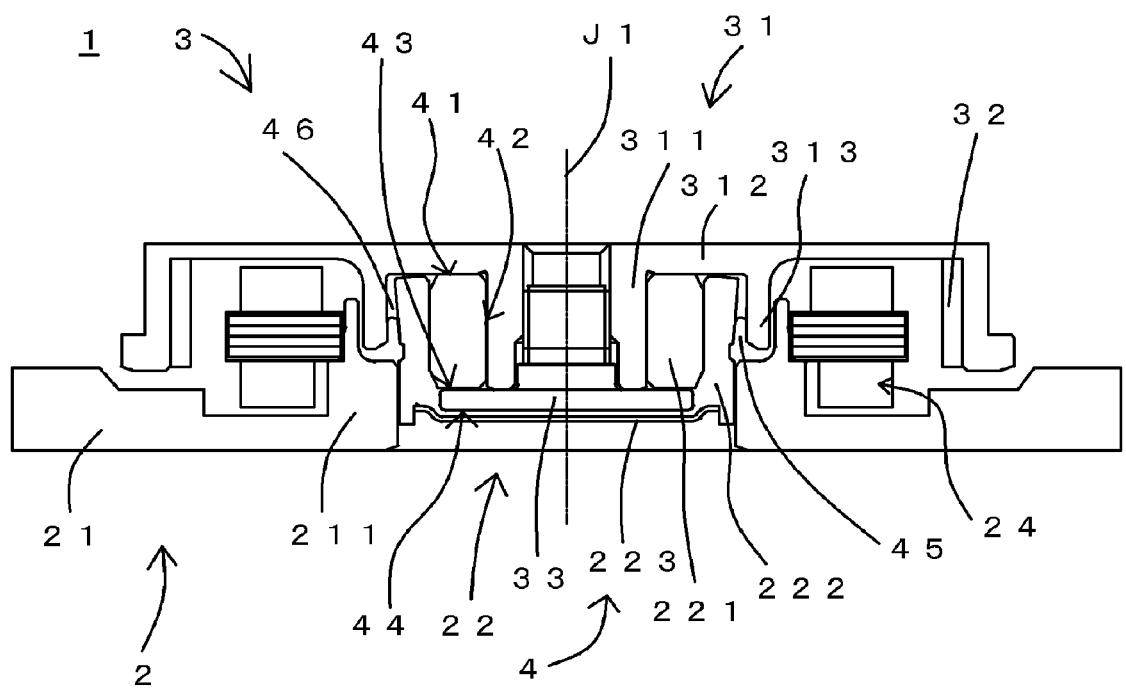
FIG. 2 is a schematic cross-sectional view of a spindle motor.

FIG. 2 is a cross-sectional view showing the motor 1 according to a preferred embodiment of the invention.

The motor 1 includes a stationary section 2 and a rotor section 3. The rotor section 3 rotates about the central axis J1 through a fluid dynamic pressure bearing 4 that uses fluid dynamic pressure caused by a lubricant 46. In the following description, for convenience, the side corresponding to the rotor section 3 along the central axis J1 has been described as the upper side and the side corresponding to the stationary section 2 has been described as the lower side. However, the central axis J1 does not need to necessarily correspond to a gravitational direction. The lubricant 46 is, for example, ester-based oil. Meanwhile, in this specification, one side in the axial direction is described as the upper side and the other side in the axial direction is described as the lower side.

The rotor section 3 includes a shaft 311, a rotor hub 31, and a rotor magnet 32. The rotor hub 31 is connected to the shaft 311. The shaft 311 and the rotor hub 31 may be formed of one component. The shaft 311 and the rotor hub 31 may be formed of separate components. A rotor magnet 32 is mounted on the rotor hub 31 and is disposed around the central axis J1.

The rotor hub 31 includes a disc-shaped disk portion 312 and a cylindrical portion 313. The disk portion 312 extends from an upper end portion of the shaft 311 so as to be substantially perpendicular to the central axis J1. The cylindrical portion 313 extends downward from the disk portion 312. A substantially disc-shaped thrust plate 33 is mounted at a lower end portion of the shaft 311. Meanwhile, the shaft 311 and the disk portion 312 may be formed of one component, but are not limited thereto. The shaft 311 and the disk portion 312 may be formed of separate components.

The stationary section 2 includes a base plate 21, a sleeve unit 22, and a stator 24. The shaft 311 of the rotor section 3 is inserted into the sleeve unit 22. The stator 24 is mounted on the base plate 21 around the sleeve unit 22. The base plate 21 may form at least a part of the first housing member. The base plate 21 may be formed of the first housing member 611 and one component. Further, the base plate 21 may be formed of a component that is separate from the first housing member 611.

The stator 24 generates torque, which has a center on the central axis J1, between itself and the rotor magnet 32 that is disposed around the shaft 311. That is, the stator 24 and the rotor magnet 32 form a drive mechanism that rotates the rotor section 3 relative to the stationary section 2.

A sleeve mounting portion 211 is formed at the central portion of the base plate 21. The sleeve mounting portion 211 protrudes upward from the base plate 21 while having a center on the central axis J1. The sleeve unit includes a porous oil-impregnated sleeve 221 (hereinafter, referred to as a sleeve 221), a sleeve housing 222, and a seal cap 223. The sleeve 221 is formed around the central axis J1 in a substantially cylindrical shape. Further, the sleeve 221 includes an inner surface 2212 where the shaft 311 is inserted. The sleeve 221 is press-fitted or inserted into the sleeve housing 222. Furthermore, an adhesive is interposed between the sleeve 221 and the sleeve housing 222. The sleeve housing 222 is formed in a substantially cylindrical shape, and is disposed on the outer surface 2211 of the sleeve 221. The seal cap 223 is formed in a substantially disc shape, and closes the opening of the lower side of the sleeve housing 222. Moreover, the sleeve unit 22 is mounted on the sleeve mounting portion 211. Meanwhile, the sleeve 221 and the sleeve housing 222 may be formed of one component. Further, the sleeve housing 222 and the seal cap 223 may be formed of one component.

The sleeve 221 is formed of a porous sintered body. The sleeve is filled with the lubricant 46. The sleeve 222 is molded using various kinds of metal powder, metal compound powder, or non-metallic powder as a raw material, and is sintered. It is preferable that Fe—Cu, Cu—Sn, Cu—Sn—Pb, Fe—C, or the like be used as the raw material of the sleeve 221. The 221 preferably has a coefficient of thermal expansion of about $12.9 \times 10^{-6}/°$ C.

An upper gap 41, a radial gap 42, a first lower gap 43, a second lower gap 44, and a seal gap 45 are formed in the motor 1. The upper gap 41 is formed between the lower surface of the disk portion 312 of the rotor hub 31 and the upper surface of the sleeve 221. The radial gap 42 is formed between the inner surface of the sleeve 221 and the outer surface of the shaft 311. The first lower gap 43 is formed between the lower surface of the sleeve 221 and the upper surface of the thrust plate 33. The second lower gap 44 is formed between the lower surface of the thrust plate 33 and the upper surface of the seal cap 223. Further, the seal gap 45 is formed between the outer surface of the sleeve housing 222 and the inner surface of the cylindrical portion 313 of the rotor hub 31.

The upper gap 41, the radial gap 42, the first lower gap 43, the second lower gap 44, and the seal gap 45 are filled with the lubricant 46. An inclined surface of the sleeve housing 222 of which the outer diameter is gradually reduced toward the lower side is formed on the outer surface of the sleeve housing 222. Furthermore, an inclined surface of the cylindrical portion of which the inner diameter is gradually reduced toward the lower side is formed on the inner surface of the cylindrical portion 313 facing the inclined surface. An interface of the lubricant 46 in the seal gap 45 forms a meniscus shape by a capillary phenomenon and surface tension.

Figure 3:
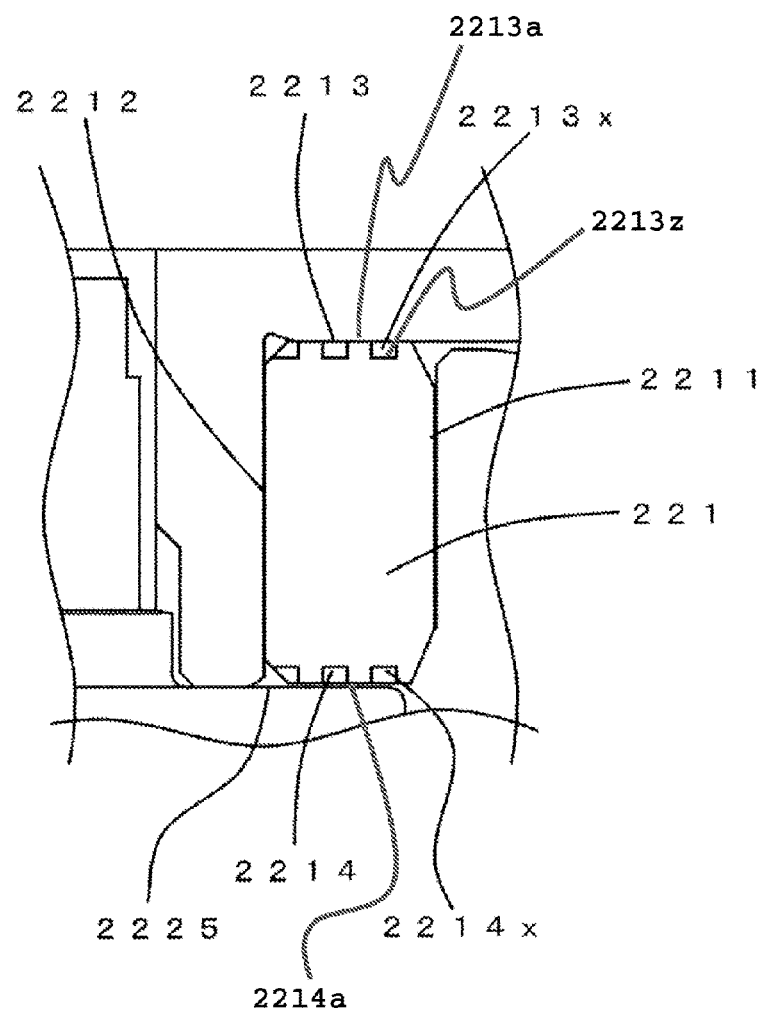
FIG. 3 is an enlarged cross-sectional view of a part of FIG. 2.

FIG. 3 is an enlarged cross-sectional view of a part of FIG. 2. A first dynamic pressure generating groove 2213x, which induces fluid dynamic pressure on the lubricant 46 during the rotation of the rotor section 3, is formed on an upper surface 2213 of the sleeve 221. The first dynamic pressure generating groove 2213x is a group of a plurality of grooves that are arranged in a circumferential direction. Further, a second dynamic pressure generating groove 2214x, which induces fluid dynamic pressure on the lubricant 46 during the rotation of the rotor section 3, is formed on a lower surface 2214 of the sleeve 221. The second dynamic pressure generating groove 2214x is a group of a plurality of grooves that are arranged in the circumferential direction. Furthermore, an upper thrust dynamic pressure bearing portion is formed at the upper gap 41, and a lower thrust dynamic pressure bearing portion is formed at the first lower gap 43. The upper surface 2213 represents a first axial end face, and the lower surface 2214 represents a second axial end face.

Meanwhile, a radial dynamic pressure generating groove, which induces fluid dynamic pressure on the lubricant 46 present in the radial gap 42, may be formed on the inner surface 2212 of the sleeve 221. A radial dynamic pressure bearing portion is formed at the radial gap 42 by this structure. The radial dynamic pressure generating groove is a group of a plurality of grooves that are arranged in the circumferential direction. The shape of the radial dynamic pressure generating groove is preferably a herringbone shape. However, the shape of the radial dynamic pressure generating groove is not limited thereto, and may be an arc shape or the like.

The first dynamic pressure generating groove 2213x may be formed on the lower surface of the disk portion 312 instead of the upper surface 2213 of the sleeve 221. The second dynamic pressure generating groove 2214x may be formed on the upper surface of the thrust plate 33 instead of the lower surface 2214 of the sleeve 221. The fluid dynamic pressure bearing may include either the first dynamic pressure generating groove 2213x or the second dynamic pressure generating groove 2214x, and may include both of the first dynamic pressure generating groove 2213x and the second dynamic pressure generating groove 2214x. The radial dynamic pressure generating groove may be formed on the outer surface of the shaft at the radial dynamic pressure bearing portion. The fluid dynamic pressure bearing may not be provided with the radial dynamic pressure bearing portion, and may be provided with only the thrust dynamic pressure bearing portion.

The first dynamic pressure generating groove 2213x is preferably formed in a spiral shape, and the second dynamic pressure generating groove 2214x is preferably formed in a spiral shape. Meanwhile, one of the first dynamic pressure generating groove 2213x and the second dynamic pressure generating groove 2214x may be formed in a herringbone shape, and the other thereof may be formed in a spiral shape. Both the first dynamic pressure generating groove 2213x and the second dynamic pressure generating groove 2214x may be formed in a herringbone shape. The lubricant 46 flows to the inside in the radial direction during rotation by the first dynamic pressure generating groove 2213x and the second dynamic pressure generating groove 2214x.

Since it is possible to form the upper thrust dynamic pressure bearing portion with a small diameter by forming the first dynamic pressure generating groove 2213x on the upper surface 2213 of the sleeve 221 as described above, it is possible to reduce a current. Meanwhile, the first dynamic pressure generating groove 2213x may be formed on the upper surface of the sleeve housing 222.

Figure 4:
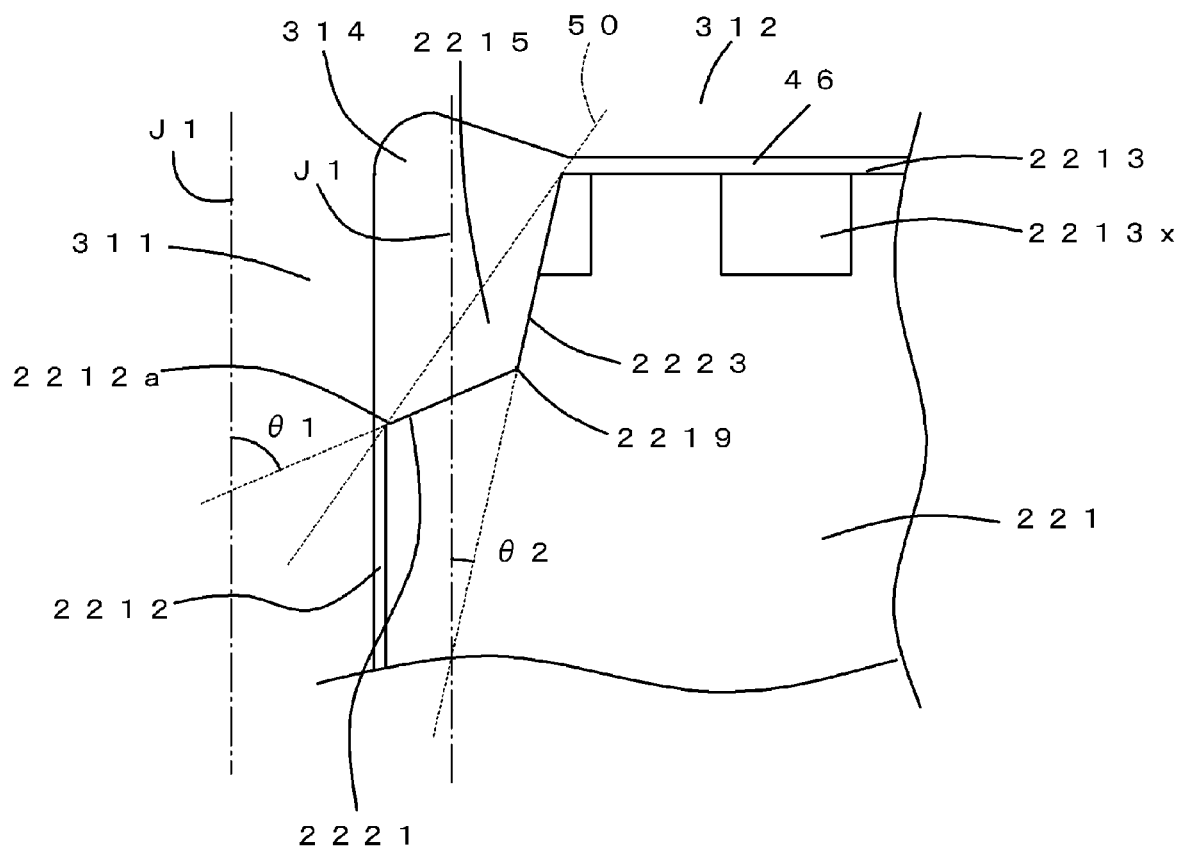
FIG. 4 is an enlarged cross-sectional view of a part of FIG. 3.

FIG. 4 is an enlarged cross-sectional view of a part of FIG. 3. As shown in FIG. 4, a first recessed portion 2215 is formed between the upper surface 2213 and the inner surface 2212 of the sleeve 221. It is preferable that the first recessed portion 2215 be a connecting surface connecting the upper surface 2213 with the inner surface 2212. The first recessed portion 2215 is positioned below a line segment 50, which connects an upper end portion 2212a of the inner surface 2212 with an inner end portion 2213y of the upper surface 2213, in a cross-section including the central axis J1. A distance between a bottom portion 2219 of the first recessed portion 2215 and the line segment 50 is the longest. The bottom portion 2219 is positioned below the bottom portion of the first dynamic pressure generating groove 2213x in the axial direction. Meanwhile, the bottom portion of the first dynamic pressure generating groove 2213x may be at least a part of the entire bottom of the first dynamic pressure generating groove 2213x, and is preferably a portion of the entire bottom of the groove that is positioned at the lowermost side.

Since the first recessed portion 2215 is formed at the sleeve 221, the protruding of the inner surface 2212 of the sleeve 221 inwardly in the radial direction is suppressed when the first dynamic pressure generating groove 2213x is formed. In particular, the protruding of an upper portion of the inner surface 2212 inwardly in the radial direction is suppressed. Accordingly, since the radial gap 42 is maintained to be uniform during the drive of the motor, the contact between the outer surface of the shaft 311 and the inner surface 2212 of the sleeve 221 is suppressed.

The first recessed portion 2215 includes a first inclined surface 2221 and a second inclined surface 2223. The first inclined surface 2221 is an annular surface that is adjacent to the inner surface 2212, and is inclined with respect to the inner surface 2212 at a first angle $\theta 1$ in the cross-section including the central axis J1. The second inclined surface 2223 is an annular surface that is positioned outside the first inclined surface 2221 in the radial direction, and is inclined with respect to the inner surface 2212 at a second angle $\theta 2$ in the cross-section including the central axis J1. The first angle $\theta 1$ is larger than the second angle $\theta 2$.

Since the first inclined surface 2221 and the second inclined surface 2223 are formed at the first recessed portion 2215, the inner end portion 2213y of the upper surface 2213 can be disposed on the inside in the radial direction. Accordingly, it is possible to increase the area of the first dynamic pressure generating groove 2213x on the upper surface 2213. For this reason, it is possible to increase pressure that is generated by the first dynamic pressure generating groove 2213x. Further, since the first angle $\theta 1$ is larger than the second angle $\theta 2$, the deformation of the upper portion of the inner surface 2212 is suppressed when the sleeve 221 is formed. In particular, the formation of burrs near the upper end portion 2212a is suppressed.

The first angle $\theta 1$ is an acute angle, and the second angle $\theta 2$ is also an acute angle. It is preferable that the first angle $\theta 1$ be in the range of 50° to 89°. It is preferable that the second angle $\theta 2$ be in the range of 1° to 40°.

Further, the inner end portion of the first dynamic pressure generating groove 2213x of the sleeve 221 is opened to the first recessed portion 2215. That is, the first dynamic pressure generating groove 2213x and the first recessed portion 2215 communicate with each other, the lubricant 46 filled in the first dynamic pressure generating groove 2213x and the lubricant 46 filled in the first recessed portion 2215 also communicate with each other. More specifically, the inner end portion of the first dynamic pressure generating groove 2213x is connected to the second inclined surface 2223. Since the inner end portion of the first dynamic pressure generating groove 2213x is opened to the first recessed portion 2215, it is possible to increase the area of the first dynamic pressure generating groove 2213x on the upper surface 2213.

As shown in FIG. 4, an annular groove portion 314 is disposed between the outer surface of the shaft 311 and the lower surface of the disk portion 312. The groove portion 314 is preferably a connecting surface that connects the outer surface of the shaft 311 with the lower surface of the disk portion 312. The groove portion 314 faces the first recessed portion 2215 with a gap interposed therebetween. The area of the first recessed portion 2215 is preferably larger than the area of the groove portion 314.

As shown in FIG. 3, a second recessed portion 2225 is formed between the lower surface 2214 and the inner surface 2212 of the sleeve 221. It is preferable that the second recessed portion 2225 have substantially the same shape as the first recessed portion 2215. The second recessed portion 2225 is a connecting surface that connects the lower surface 2214 with the inner surface 2212. The second recessed portion 2225 is positioned above a line segment, which connects a lower end portion of the inner surface 2212 with an inner end portion of the lower surface 2214, in the cross-section including the central axis J1. A distance between a bottom portion of the second recessed portion 2225 and the line segment is longest. The bottom portion of the second recessed portion 2225 is positioned above a bottom portion of the second dynamic pressure generating groove 2214x in the axial direction. Meanwhile, the bottom portion of the second dynamic pressure generating groove 2214x may be at least a part of the entire bottom of the second dynamic pressure generating groove 2214x, and is preferably a portion of the entire bottom of the groove that is positioned at the uppermost side. The first axial end face 2213 is positioned on a first side 2213a in the axial direction, and a second axial end face 2214 is on a second side 2214a opposite to the first side 2213a in the axial direction. The first dynamic pressure generating groove 2213x has a first bottom portion 2213z.

Figure 5:
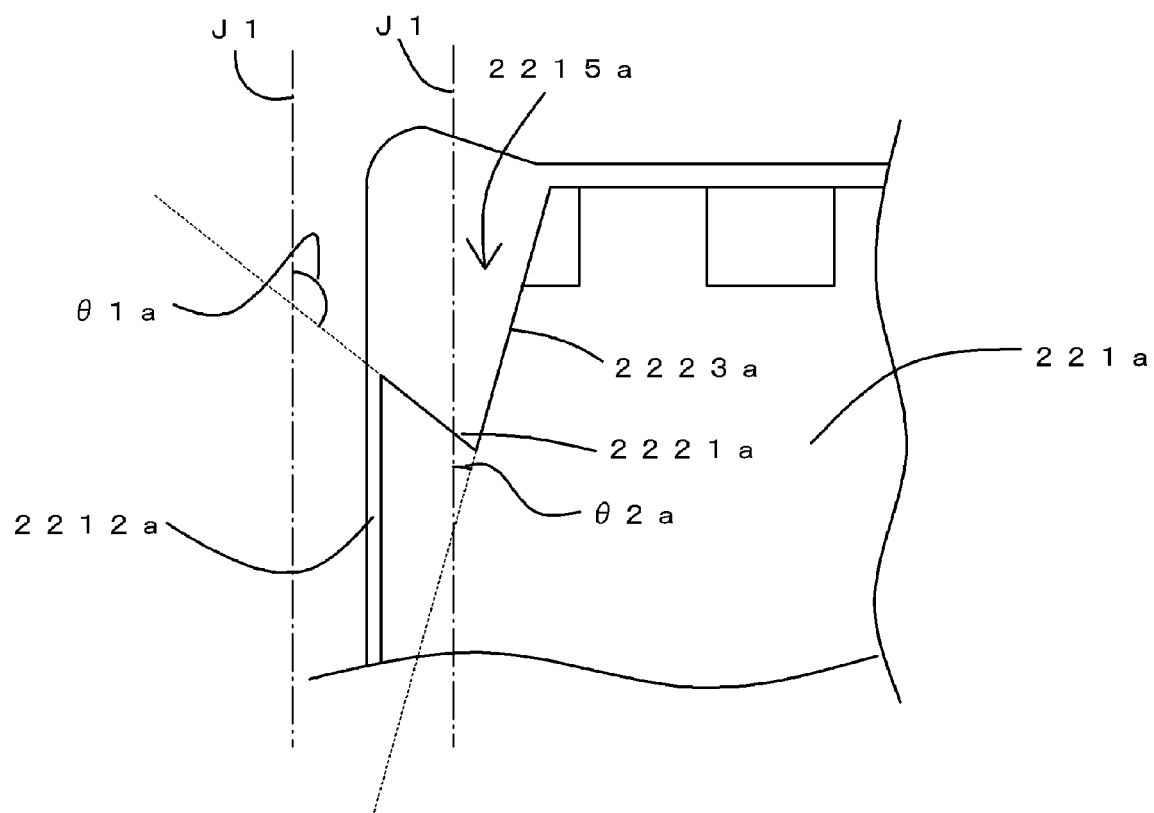
FIG. 5 is a cross-sectional view showing a modification.

FIG. 5 is a cross-sectional view showing a modification of the preferred embodiment. The basic structure of the modification is the same as that of the motor of the preferred embodiment. As shown in FIG. 5, a first recessed portion 2215a of the sleeve 221a includes a first inclined surface 2221a and a second inclined surface 2223a. The first inclined surface 2221a is an annular surface that is adjacent to an inner surface 2212a, and is inclined with respect to the inner surface 2212a at a first angle θ1a in the cross-section including a central axis J1. The second inclined surface 2223a is an annular surface that is positioned outside the first inclined surface 2221a in a radial direction, and is inclined with respect to the inner surface 2212a at a second angle θ2a in the cross-section including the central axis J1. The first angle θ1a is larger than the second angle θ2a.

In the modification, the first angle θ1a is an obtuse angle and the second angle θ2a is an acute angle. It is preferable that the first angle θ1a be in the range of 91° to 145°. It is preferable that the second angle θ2a be in the range of 30° to 60°.

Since the first inclined surface 2221a and the second inclined surface 2223a are formed at the first recessed portion 2215a in the modification, it is possible to obtain the same effect as the preferred embodiment.

Figure 6:
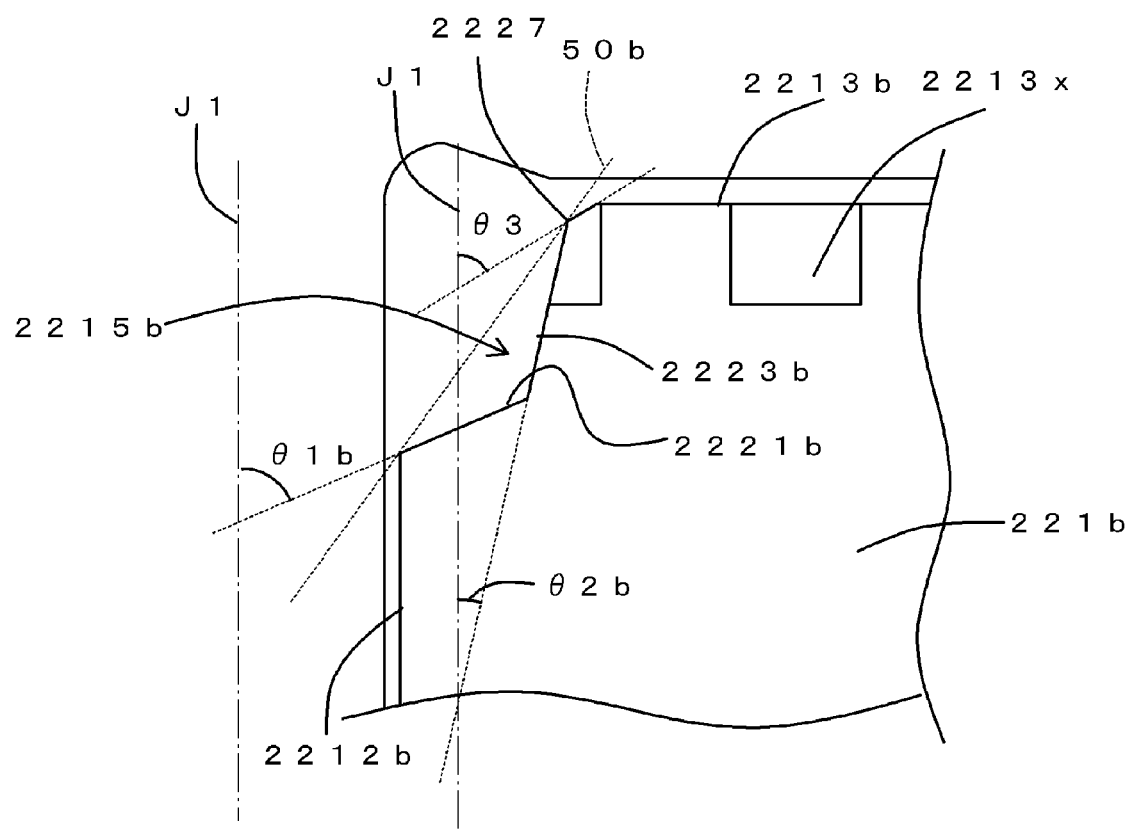
FIG. 6 is a cross-sectional view showing another modification.

FIG. 6 is a cross-sectional view showing another modification of the preferred embodiment. The basic structure of another modification is the same as that of the motor of the preferred embodiment. As shown in FIG. 6, a first recessed portion 2215b includes a first inclined surface 2221b and a second inclined surface 2223b. An upper-end inclined surface 2227 is formed at an inside of an upper surface 2213b of a sleeve 221b.

The first inclined surface 2221b is an annular surface that is adjacent to an inner surface 2212b, and is inclined with respect to the inner surface 2212b at a first angle θ1b in the cross-section including a central axis J1. The second inclined surface 2223b is an annular surface that is positioned outside the first inclined surface 2221b in a radial direction, and is inclined with respect to the inner surface 2212b at a second angle θ2b in the cross-section including the central axis J1. The first angle θ1b is larger than the second angle θ2b. The upper-end inclined surface 2227 is an annular surface that is positioned outside the second inclined surface 2223b in the radial direction, and is inclined with respect to the inner surface 2212b at a third angle θ3 in the cross-section including the central axis J1.

In still another modification, the third angle θ3 is preferably an acute angle. The third angle θ3 is preferably larger than the second angle θ2b. For example, it is preferable that the third angle θ3 be in the range of 30° to 60°. The third angle θ3 is more preferably in the range of 40° to 50°. It is preferable that the third angle θ3 be about 45° in an actual device.

Further, an inner end portion of a first dynamic pressure generating groove 2213b is preferably connected to the second inclined surface 2223b and the upper-end inclined surface 2227. It is possible to obtain the same effect as the preferred embodiment by this structure.

Since the upper-end inclined surface 2227 is formed at the sleeve 221b, the deformation of an upper portion of the second inclined surface 2223b is suppressed when the sleeve 221b is formed. In particular, the formation of burrs near an upper end portion of the second inclined surface 2223b is suppressed.

Figure 7:
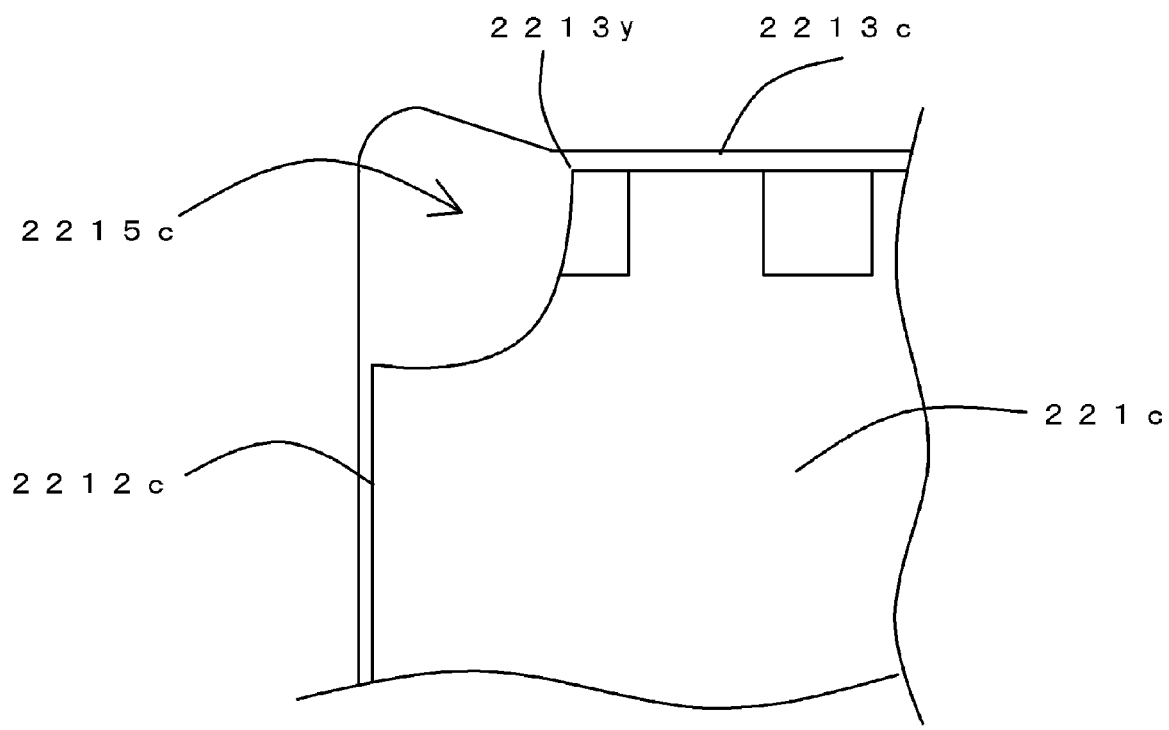
FIG. 7 is a cross-sectional view showing still another modification.

FIG. 7 is a cross-sectional view showing still another modification of the preferred embodiment. The basic structure of still another modification is the same as that of the motor of the preferred embodiment. As shown in FIG. 7, a first recessed portion 2215c of the sleeve 221c is a connecting surface that is adjacent to an inner surface 2212c and an upper surface 2213c. The connecting surface is preferably a curved surface. It is possible to obtain the same effect as the preferred embodiment in still another modification.

In the preferred embodiment and the modifications shown in FIGS. 1 to 7, the inner surfaces of the sleeve may include a plurality of inclined surfaces. For example, an upper inclined surface may be formed at the upper portion of the inner surface of the sleeve, and the upper inclined surface may be connected to the first recessed portion.

Further, the first recessed portion has included two inclined surfaces in FIGS. 4 to 6, but is not limited thereto. The first recessed portion may include three inclined surfaces or three or more inclined surfaces.

Furthermore, the fluid dynamic pressure bearing may not be provided with the radial dynamic pressure bearing portion and may be provided with only at least one thrust dynamic pressure bearing portion.

Both a shaft-rotating spindle motor and a shaft-fixed spindle motor may be used as the spindle motor. Further, both an outer rotor type spindle motor and an inner rotor type spindle motor may be used as the spindle motor.

Furthermore, the spindle motor is not limited to a disk drive device, and may be used for various kinds of electronic equipment such as a fan.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A porous oil-impregnated sleeve that is used for a fluid dynamic pressure bearing and extends around a central axis, the porous oil-impregnated sleeve comprising:
   an outer surface;
   an inner surface for inserting a shaft, the inner surface opposite to the outer surface, the shaft extending in an axial direction having a central axis;
   a first axial end face that is positioned on a first side in the axial direction;
   a second axial end face on a second side opposite to the first side in the axial direction;
   a first recessed portion connecting the inner surface with the first axial end face; and
   a first dynamic pressure generating groove having a first bottom portion, the first dynamic pressure generating groove positioned on the first axial end face,
   wherein the sleeve is filled with a lubricant,
   wherein the first recessed portion is recessed from a line segment connecting an end portion of the inner surface with an inner end portion of the first axial end face, in a cross-section along the central axis, and
   wherein the first recessed portion has a second bottom portion farthest away from the line segment, and
   wherein the second bottom portion is closer to the second side than the first bottom portion of the first dynamic pressure generating groove.

2. The sleeve according to claim 1,
   wherein the first recessed portion includes a first inclined surface that is an annular surface adjacent to the inner surface and is inclined with respect to the inner surface at a first angle in the cross-section along the central axis, and a second inclined surface that is an annular surface positioned outside the first inclined surface and is inclined with respect to the inner surface at a second angle in the cross-section along the central axis, and
   the first angle is larger than the second angle.

3. The sleeve according to claim 2,
   wherein the first angle is an acute angle.

4. The sleeve according to claim 2,
wherein the first angle is an obtuse angle, and
the second angle is an acute angle.

5. The sleeve according to claim 2,
wherein in the axial direction, the second bottom portion of the first recessed portion is positioned closer to the first side than the end portion of the inner surface.

6. The sleeve according to claim 2,
wherein in the axial direction, the second bottom portion of the first recessed portion is positioned closer to the second side than the end portion of the inner surface.

7. The sleeve according to claim 1,
wherein in the axial direction, the second bottom portion of the first recessed portion is positioned closer to the first side than the end portion of the inner surface.

8. The sleeve according to claim 1,
wherein in the axial direction, the second bottom portion of the first recessed portion is positioned closer to the second side than the end portion of the inner surface.

9. The sleeve according to claim 1,
wherein first recessed portion is formed as a curved surface.

10. The sleeve according to claim 1, further comprising:
a second recessed portion connecting the inner surface with the second axial end face, and
a second dynamic pressure generating groove having a third bottom portion, the second dynamic pressure generating groove positioned on the second axial end face,
wherein the second recessed portion is recessed from a second line segment that connects a second end portion of the inner surface with an inner end portion of the second axial end face, the second end portion being opposite to the first end portion in the axial direction,
wherein the second recessed portion has a fourth bottom portion farthest away from the second line segment, and
wherein the fourth bottom portion is closer to the first side than the third bottom portion of the second dynamic pressure generating groove.

11. A fluid dynamic pressure bearing comprising:
the sleeve according to claim 1;
the shaft inserted in the inner surface of the sleeve; and
a disk portion that extends outwardly from an outer peripheral surface of the shaft in a radial direction and faces the first axial end face of the sleeve,
wherein a radial gap formed between an outer surface of the shaft and the inner surface of the sleeve and an upper gap formed between the first axial end face of the sleeve and the disk portion are filled with the lubricant, and
the first dynamic pressure generating groove has a shape in which the lubricant filling a thrust gap is guided inwardly in the radial direction.

12. The fluid dynamic pressure bearing according to claim 11,
wherein an inner end portion of the first dynamic pressure generating groove is opened to the first recessed portion.

13. The fluid dynamic pressure bearing according to claim 12,
wherein an annular groove portion is provided between the shaft and the disk portion, and
the area of the first recessed portion is larger than the area of the groove portion.

14. A spindle motor comprising:
the fluid dynamic pressure bearing according to claim 12.

15. Electronic equipment comprising:
the spindle motor according to claim 14.

16. The fluid dynamic pressure bearing according to claim 11,
wherein an annular groove portion is provided between the shaft and the disk portion, and
the area of the first recessed portion is larger than the area of the groove portion.

* * * * *